April 23, 1946. J. W. DRINNON 2,398,887
WEIGHING MACHINE CONTROL
Filed Jan. 15, 1943 2 Sheets-Sheet 1
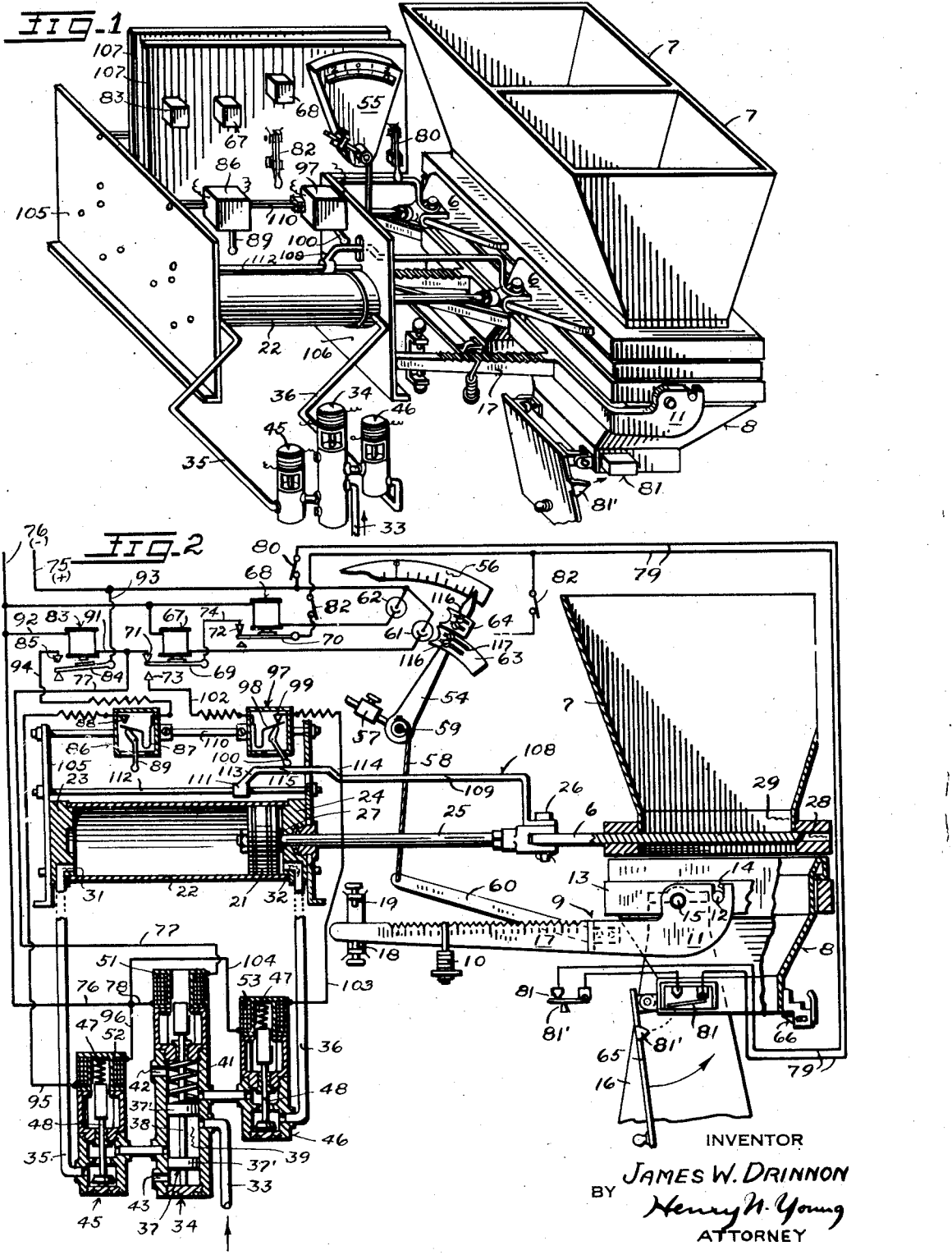
INVENTOR
JAMES W. DRINNON
BY Henry W. Young
ATTORNEY INVENTOR
James W. Drinnon
BY Henry N. Young
ATTORNEY Patented Apr. 23, 1946

2,398,887

UNITED STATES PATENT OFFICE 2,398,887

WEIGHING MACHINE CONTROL

James W. Drinnon, Eatonville, Wash.

Application January 15, 1943, Serial No. 472,479

5 Claims. (Cl. 249—22)

The invention relates to a control for an automatic weighing-out machine having the discharge gate of a supply bin or the like arranged for the gravity delivery of a predetermined quantity of material therethrough to the weighing pan or hopper of a unitarily associated weighing-out scales.

A primary object of the invention is to provide an improved device for automatically disposing an open bin gate of the type described in a predetermined dribble position for the discharging material as the weight of the material being deposited in the weighing pan approaches its desired value.

Another object is to provide for automatic and particularly rapid resettings of the bin gate throughout a continuous cycle of open and dribble and closed positions therefor.

A further object is to provide a bin gate control of the character described having means adjustable to adjustably predetermine the open and dribble positions of the gate with respect to its closed position.

Yet another object is to provide a gate control in which certain of the static gate positions are automatically assumed without mechanical shock.

An added object is to provide a coordinated control of a plural of the weighing machines such that simultaneous weighing operations of the different machines may provide charges having a desired predetermined weight ratio.

A still further object is to provide a control such that an aforesaid cycle of gate positionings may be initiated only if and when each scale pan is empty and its discharge gate is closed.

The invention possesses other objects and features of advantage, some of which, with the foregoing, will be brought out or be apparent in the following description of a typical embodiment of the invention, and in the accompanying drawings, in which, Figure 1 is a perspective view showing a two-compartment bin associated with a pair of weighing-out scales and having the present gate control means applied thereto, the bin gates being closed.

Figure 2 is a somewhat schematic and partly sectional showing of the apparatus of Figure 1 and electrical control circuits thereof.

Figure 3:
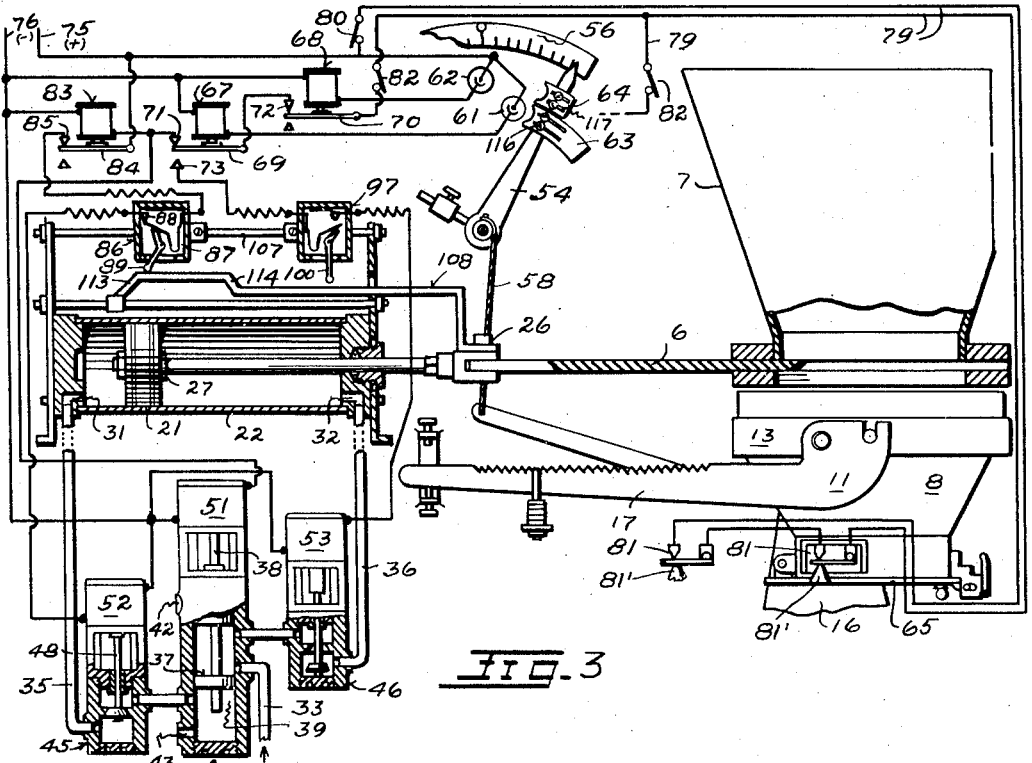
Figures 3 and 4 are views similar to Figure 2 showing the conditions of the other apparatus elements when the gate is respectively disposed in its fully open and dribble positions.

For the purpose of illustrating my invention, the present control device is shown as operatively associated with slide gates 6 which are openable for the gravity discharge of dry comminuted materials from a pair of adjacent fixed bins 7 into underlying weighing pans or hoppers 8 of a pair of like weighing scales of the steelyard type. The pans 8 are carried on corresponding arms of intermediately fulcrumed beams or levers 9 for a weighing counterbalancing of the loaded pans by means of weights 10 carried on the other beam arms. The present association of supply bins with a like number of weighing scales is provided to facilitate the simultaneous weighing out of charges of different materials which are to be mixed in a predetermined proportion of weights; with the bins and scale pans in close adjacency as shown, the pans may be directly emptied into a common removable container (not shown) for the mixing of their charges therein. The present control device is generally duplicated for each bin and its associated scales, and will hereinafter be generally described as in a single such combination.

Each present pan 8 is rectangular in plan, and the corresponding scale beam 9 is forked to swingably mount the pan between and upon the fork sides 11 near their free ends; as shown, mutually coaxial trunnions 12 extending laterally from opposite sides of a frame 13, supportingly engaged beneath the pan rims, are removably engaged in complementary bearing notches 14 extending from the tops of the fork sides 11 for the swinging support of the pan upon the beam for its suspended free swinging about the axis of the trunnions. At like distances inwardly of the bearings 14, the fork sides 11 mount aligned and outwardly directed trunnions 15 for journalled engagement in bearings provided in fixed support standards 16.

The unforked arm portion 17 of the beam 9 extends generally horizontally and mounts the counterweight 10 which may have a variable mass and is arranged for its adjusted disposal along the arm to predetermine the load which the pan is to receive as counterbalancing the weight 10, the arm 17 being preferably calibrated therealong to facilitate the desired adjusted disposal of the counterweight thereon. The free end of the arm 17 is constrained to its swinging in a vertical plane between fixed lower and upper stops 18 and 19 respectively, and is arranged to rest upon the stop 18 while the pan 8 is empty or contains up to slightly less than the full charge to be weighed out therein. As the pan is loaded by the fall of material thereinto through the open gate 6 and a full load is approached, the arm 17 will swing upwardly toward an intermediate position thereof between the stops 18 and 19, which position is that of true balance and weighing for the charge in the pan. The engagement of the arm 17 with the upper stop 19 limits the lowering of the pan by reason of any overcharge of material therein.

In using a weighing-out scales of the present type wherein a weighing pan is arranged to gravitationally receive a fluid material through a more or less open gate of a supply bin, the flow rate of different materials through a gate opening of given size is found to vary with the different materials, being influenced by the inherent characteristics of the material and the size of its particles. Furthermore, for providing a predetermined exact weighed-out mass in the pan, the gate must be completely closed at the precise moment when the material still falling between the gate and pan is required to complete the desired weighed-out charge in the pan. Noting that the difficulty of predetermining the precise moment of closing the gate increases with the flow rate just before the gate is closed and is also affected by the rate of closing the gate against the resistance of the discharging stream to be cut off, it is a present primary purpose to provide a means which is automatically operative to dispose and maintain such a bin gate in an adjusted fully open position until just before the desired mass has flowed from the bin, partly close the gate to a so-called dribble position to thereafter provide a much reduced flow rate from the bin, and finally close the gate when the relatively small amount of falling, or suspended material cut off below the gate will complete the mass being weighed out in a scale pan; in this manner, the scale pan may be repeatedly charged with a predetermined mass of material from a bin in a minimum of time and with a maximum of accuracy.

In providing the aforesaid positioning cycle for the bin gate 6 through which material is arranged to gravitationally flow to the scale pan 8, I preferably provide and utilize a fluid-operated double acting piston 21 which is reciprocable in a cylinder 22 having heads 23 and 24; for reasons which will hereinafter become apparent, I prefer to utilize a compressed gaseous fluid, as air, for actuating the piston. The axis of the cylinder 22 is parallel to the line of movement of the horizontal slide gate 6, and a piston rod 25 extends through a usual stuffing box in the cylinder head 24 to a pin-and-clevis connection 26 with the inner end of the gate 6. In the present structure, a bumper ring 27 of resilient material is carried on the rod 25 for engagement between the piston 21 and the cylinder head 24 to limit the closing movement of the gate 6 which is operative in a suitable slideway 28 provided around the sides of the discharge opening 29 of the bin 7.

Ports 31 and 32 in the cylinder heads 23 and 24 provide for the intake or discharge of the piston-operating fluid for the cylinder at opposite sides of the piston 21 in accordance with the piston action to be provided. Assuming that compressed air is the operating fluid to be used, a pipe 33, which comprises a source of compressed air by reason of its connection with an air compressing means not shown, is arranged to supply piston-operating air to the cylinder through a two-way, or reversing, valve 34 which is connected to the ports 31 and 32 by pipes 35 and 36 respectively and is operative to deliver compressed air through one said pipe while the other pipe functions as an exhaust pipe for the cylinder. As particularly shown, the valve 34 is of the reciprocating two-part piston type, having its piston comprising disc-shaped parts 37' mounted on a common stem 38 and operatively reciprocable in a chamber 39.

A compression spring 41 yieldingly urges a disposal of the valve piston 37 to maintain a limiting position shown for it in Figure 2, in which position the pipe 35 is connected with the supply pipe 33 between the piston parts 37' while the pipe 36 is connected through an end chamber part beyond the piston to an exhaust port 42 in the chamber side. A displacement of the valve piston 37 to its other limiting position in the chamber 39, as shown in Figure 3, is arranged to effect a delivery of compressed air from the supply pipe 33 and between the piston parts 37' to the pipe 36 while simultaneously connecting the pipe 35 through the other end chamber part with an exhaust port 43 at said chamber part.

Normally open poppet valves 45 and 46 are operatively interposed in the pipes 35 and 36 respectively, each said valve being arranged for a valve-closing disposal of its disc against the resistance of springs 47 which are cooperative with the valve stems 48. If the valve 45 is closed while the piston 21 is in motion for opening the bin gate 6, the resulting compression of the air imprisoned in the cylinder portion and the pipe 35 between the piston 21 and the valve 45 will stop the motion of the piston when the pressure at both sides of the piston becomes that in the air supply pipe 33; a corresponding piston-stopping action results from a closing of the valve 46 while the gate is closing. Accordingly, the opening or closing movement of the gate may be stopped with the gate in any desired intermediate position merely by closing the valve 45 or 46 at the appropriate time while the gate is moving under the influence of air pressure behind the piston 21; when the piston-actuating medium is air, rather than a liquid, the gate may be stopped with a cushioned action as the stopping pressure builds up between the piston and the closed valve. In the present apparatus, the closing of the valve 45 is utilized to limit the gate-opening movement of the piston to less than its possible full stroke, while the closing of the valve 46 is utilized to control the gate-closing movement of the piston for disposing the closing gate in a desired dribble position for completing the weighing-out of a charge in the scale pan 8 in the described manner.

It will now be noted that the features of the present invention particularly relate to the automatic control of the disposal of the gate 6 in a cycle of open and dribble and closed positionings thereof through an appropriate control of the air valves 34 and 45 and 46; in the present apparatus, said valves comprise electro-magnetic motor valves connected in an electric control circuit. As is particularly shown, the stems of the various valves 34 and 45 and 46 mount magnetic cores which are axially slidable within solenoids 51 and 52 and 53 respectively and are normally held in extending relation to the solenoids by the actions of the various valve springs 47; the energizing of any one of said solenoids is arranged to retract its core within it to change the setting of its valve from normal.

Essentially, the circuit for the electro-magnetic valves is so controlled in accordance with the loading conditions at the pan 8 that the valve 34 is reversed from normal when the bin gate 6 is opened for loading the pan. The valve 45 is automatically closed for limiting the opening movement of the gate in the indicated manner while the valve 34 remains reversed, the valve 34 is restored to its normal condition and the valve 45 opened when the closing movement of the gate to its dribble position is to be effected, the valve 46 is closed as required for stopping the gate in its dribble position in the described manner, and the valve 46 is opened for the complete closing of the gate when the charge in its pan is complete. Recalling that the pan will lower and the beam arm 17 will correspondingly swing upwardly as a full pan charge is approached during a loading of the pan, use is made of such movements in the aforesaid automatic control of the motor valve circuit by the employment of a photoelectric means which functions in direct accordance with the disposition of the beam arm as the pan is loaded to successively provide both the dribble and closed settings for the gate, associated means being further provided for adjustably predetermining the fully open and dribble settings for the gate as respectively determined by the closings of the valves 45 and 46.

As illustrated, the index hand 54 of a usual balance-indicator 55, which hand is arranged for its swinging in front of a scale 56 to indicate with reference to an intermediate zero point when balance has been reached with a load in the pan, is utilized in providing the photoelectric control. A counterweight 57 on the hand 54 urges a disposal of the hand toward the zero scale position to a degree which just keeps taut a flexible cord 58 extending from the scale beam 9 and so engaged about the hand-conveying hub 59 that the movement of the beam arm 17 may be indicated and magnified at the point of the hand; as shown, the constantly taut cord 58 is attached to the beam at the end of an arm 60 fixed to a fork side 11 of the beam to extend laterally of the beam 17.

Noting that the hand 54 is disposed at its furthest point from the zero point of the scale 56 while the beam arm 17 rests on the arm stop 18, photoelectric cells 61 and 62 are mounted in the casing 55 in positions to have correspondingly masks 63 and 64 carried by the hand 54 successively mask them from their associated illuminating lamps (not shown) as the hand moves toward the zero of the scale by reason of an increasing loading of the pan. The cells 61 and 62 are so positioned and the masks 63 and 64 are so shaped that the mask 63 will cut off the illuminating light from the cell 61 during the first part of the raising movement of the beam arm 17 (Figure 3), and the mask 64 will cut off the light from the cell 62 only as a full loading of the pan is thereafter closely approached and reached, the mask 63 remaining operative with respect to the cell 61; the full-load position for the hand and mask is indicated in dash lines in Figure 4. When the pan 8 is unloaded, as by opening a discharge gate 65 at its bottom, the scale beam 9 rocks under the influence of the weight 10 to restore the hand 54 to its full off-zero and cell-unmasking position of Figure 1 and to raise the pan to its loading position for its subsequent reloading when the bin gate 6 is opened. The present pan gate 65 is hinged to the pan bottom at the back line thereof and is arranged for its retention in closed position by means of a manually releasable catch 66 at the pan front.

It will now be noted that the normally illuminated photoelectric cells 61 and 62 of each pair are connected in independent and normally closed circuits including the solenoids of relays 67 and 68 respectively which control their armatures 69 and 70 as switch arms to close control circuits for the apparatus at contacts 71 and 72 when the respective solenoids are energized. When the cell 61 is masked, the resulting deenergizing of its circuit effects an opening of the relay switch 67 at the contact 71 and the disposal of its armature 69 against a contact 73, whereby the relay 67 provides a double-acting switch. When the cell 62 is masked, the resulting deenergizing of its circuit effects an opening of the relay switch 68 at the contact 72 and a disposal of its armature 70 against a suitable stop or rest which limits its movement away from the solenoid 68. Since the masking of an illuminated cell 61 or 62 increases the resistance of its circuit thereat to effectively deenergize the circuit, its functioning in its relay switch control circuit is actually that of a switch means and it may therefore be generally so considered and referred to. A lead 74 connects the armature 69 of the relay 67 with the contact 72 of the relay 68, and the latter relay provides only a single-acting switch which is closed while the relay solenoid is energized. Gravity and/or a spring means constantly urges the opening of the relay switches at the contacts 71 and 72, and energy for the various circuits may be derived from a common source which is shown as represented by power wires 75 and 76. Leads 77 and 78 respectively connect the solenoid 51 of the air valve 34 with the contact 71 of the switch 67 and with the wire 76.

A lead 79 having a switch 80 and two switches 81 in series therein connects the wire 75 through switches 82 beyond a branching point of the lead with the armatures 70 of the relays 68 of the different scales to complete like control circuits for simultaneously or selectively energizing the latter circuits when both or either is closed at all of the openable points thereof; the control circuit portion beyond one switch 82 has been omitted for avoiding needless duplication. The switch 80 and the switches 82 are arranged for direct manual closing or opening by the operator of the apparatus, while the switches 81 are arranged to be individually closed only when the discharge gates 65 of the different scale pans 8 are closed; as disclosed, the switches 81 are mounted on the different pans 8 for closing with the gates 65 by the action of arms 81' carried by the gates. The arrangement is such that, with the circuit of either or both reversing valves 34 otherwise closed at the switch 80 and elsewhere, the closing of both pan gates 65 will automatically cause an opening of the bin gates 6 for charging both pans from the bins. On the other hand, the operator may use the switch 80 as a manual control means for the circuits even if the gates 65 are closed, it being understood that the requirement that the switches 80 and 81 all be closed before either pan gate circuit is closable comprises an important safety device with respect to the operation of the apparatus. If only one of the scales is to be used for measuring out material, the corresponding switch 81 on the pan of the unused scales would be kept closed to automatically start an operative cycle for the scales in use when the pan gate of the latter is closed.

The control circuit for each motor valve 45, which valve is arranged to be closed to stop the opening movement of the gate short of the limit otherwise mechanically imposed by building up a back pressure ahead of the piston 21, includes a relay 83 and a mechanically controlled switch 86. The relay 83 has its armature 84 operative as a switch arm to engage a contact 85 when its solenoid is energized, and the switch 86 comprises a spring arm 87 for circuit-closing engagement with a contact 88 by reason of an appropriate rocking of a trigger lever 89 by means hereafter described. Leads 91 and 92 connect the solenoid of the relay 83 with the contact 71 of the relay 67 and the wire 76 respectively, whereby said solenoid is connected in parallel with the solenoid 51 of the reversing valve 34 and, therefore, is energized only when the latter solenoid is energized. The connections for the circuit of the motor valve 45 comprises a lead 93 from the wire 75 to the armature 84, a lead 94 from the contact 85 to the spring arms 87 of the switch 86, a lead 95 from the contact 88 to the solenoid 52 of the valve 45, and a lead 96 from the latter solenoid to the wire 76. The circuit conditions when the motor valve 45 is closed are shown in Figure 3.

Figure 4:
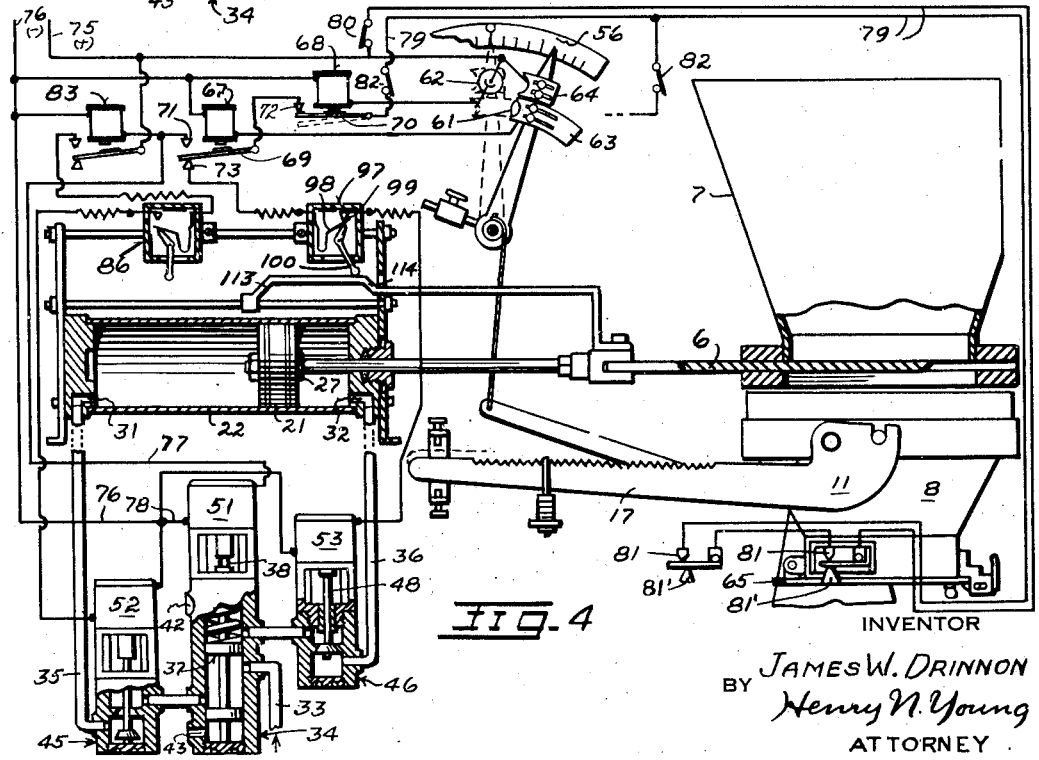

The control circuit for each motor valve 46, which valve is arranged for closing during a gate-closing movement of the piston 21 to stop the gate 6 in dribble position by building up a back-pressure ahead of the piston, includes a mechanically controlled switch 97 similar to the switch 86 and comprising a spring contact arm 98 engageable with a fixed contact 99 by the action of a trigger lever 100 against it. A lead 102 connects the contact 73 of the relay 67 with the spring contact 98 of the switch 97, a lead 103 connects the contact 99 with one terminal of the solenoid 53 of the motor valve 46, and a lead 104 connects the other terminal of the solenoid with the wire 76. It will be noted that the valve solenoid 53 will be energized only if and while the armature 69 of the relay 67 engages the contact 73 and the switch of the relay 68 is closed and the switches 81 and 82 are closed; the circuit conditions when the motor valve 46 is closed are shown in Figure 4, it being noted that the mutually parallel circuits for the valve 45 and the reversing valve 34 are open at the relay 67.

It will now be noted that the cylinders 22 of the present apparatus are supported on and between upright plates 105 and 106 engaging the cylinder heads 23 and 24 respectively, and that upright instrument panels 107 extending between the plates mount the relays 67 and 68 and 83, the balance indicators 55, and the hand switches 80 and 82. Rods 110 are fixed to and between the plates 105 and 106 in lines parallel to the cylinder axis and mount the pairs of switches 86 and 97 for their independently adjusted positioning therealong between said plates and to dispose the free ends of their trigger levers 89 and 100 in the lines of action of trip members which are movable with the gates 6 for engaging the levers 89 and 100 to close their switches at appropriate times during the opening and closing movements respectively of the gates.

In the present structure, the trip members for the switch-closing levers 89 and 100 comprise rods 108 having their forward ends fixed to the gates 6 at the connection 26 and having portions 109 laterally offset from the cylinders and piston rod for their extension opposite the cylinders in parallel relation thereto. At its rear end, each rod portion 109 is provided with an eye 111 which slidably receives a guide rod 112 fixed to and between the support plates 105 and 106 in parallel relation to the cylinder axis whereby the rod portion 109 is retained in fixed parallel spaced relation to said axis during the reciprocation of the rod with the gate. At its inner end part, the rod portion 109 is formed with an offset having oblique rear and front ends 113 and 114 connected by a straight portion 115, said offsets being so formed and disposed with respect to the free ends of the levers 89 and 100 that the offset end 113 is operative as a cam against the lever 89 to close the switch 86 as the gate is being opened, while the offset end 114 is operative as a cam against the lever 100 to close the switch 97 as the gate is being closed; in each case, the ends of the switch arms are arranged to ride on the intermediate offset portion 115 after their switches are closed. It will be understood that the rod 108 is operative as a common cam rod with respect to the switch levers at the times in the opening and closing strokes of the gate determined by the adjusted settings of the switches on the support rod 110.

By particular reference to Figure 2, it will be noted that the conditions of the apparatus parts and control circuits therein shown are those when the apparatus is static at the end of a working cycle of the apparatus and after the release of the weighed-out charges from the different scale pans 8, the general control switch 80 and the branch control switches 82 all being closed to provide for an automatic simultaneous starting of the weighing-out cycles for both scales when both pan gates 65 have been closed to close the open switches 81. Mechanically, each weighing-out assembly has its gate 6 positively held closed by the piston 21 which is held in gate-closing position by air pressure by reason of the connection of the cylinder at its head 23 through the open valve 45 and the normally disposed reversing valve 34 with the compressed air pipe 33, while the beam arm 17 is depressed to dispose the indicator hand 54 carrying the masks 63 and 64 in off-zero position to inoperatively dispose the masks with respect to the photoelectric cells 61 and 62. Electrically, each weighing-out assembly has the solenoids of the relays 67 and 68 energized to close the switches of the relays at the contacts 71 and 72 respectively, the solenoid of the relay 83 is unenergized whereby the switch of this relay is open, the switch 86 is open, and the switch 97 is closed by reason of the engagement of the free end of its switch-closing lever 100 by the cam rod portion 115.

If now, the pan gates 65 are closed to close both of the switches 81, a circuit will be closed through the switches of the relays 67 and 68 and the solenoid 51 of the reversing valve 34 of each assembly having its switch 82 closed, whereby to set said valve for supplying air to the cylinder at its port 32 through the open valve 46 while providing for the escape and expulsion of the air from the other cylinder end through the open valve 45 and the exhaust port 43 of the valve 34. The energizing of the aforesaid circuit will simultaneously energize the solenoid of the relay 83 which is in parallel with the solenoid 51 of the reversing valve 34 to simultaneously close the relay switch at the contact 85 in the circuit which includes the switch 86 and the solenoid 52 of the motor valve 45.

The aforesaid reversed setting of the valve 34 having resulted in a movement of the piston 21 to effect an opening stroke of the bin gate 6, said movement will continue until the piston movement is stopped by the back pressure created ahead of the piston by reason of the closing of the motor valve 45 upon the energizing of its solenoid 52; accordingly, the switch 86 is so positioned on the support rod 110 that the cam rod portion 113 will operatively engage its lever 89 for closing the switch at such a time that the gate 6 will thereafter come to rest at its desired open position. The apparatus and circuit conditions when a bin gate 6 is stopped in its desired open position are shown in Figure 3, it being understood that the adjusted positioning of the switch 86 must take into account the fact that the piston movement will continue after the switch is closed and until the total pressures at both piston sides are equal.

As the material to be weighed out flows from a bin through its opened gate 6, its accumulation toward providing a charge of desired weight in the underlying pan 8 finally produces an upward displacement of the scalebeam arm 17 and a corresponding swinging of the indicator hand 54 toward its zero position, the arm and hand movement being continued in accordance with the rate of increase of the weight of material in the pan. Such a movement of the hand 54 is arranged to cut off the light from the photoelectric cell 61 at an appreciable time before the full desired charge has been deposited in the pan by disposing the mask 63 between the cell and the light source (not shown) which normally illuminates it, and so cause such a deenergizing of the solenoid of the relay 67 that the armature 69 is released from the contact 71 to engage the contact 73 of the relay.

The resulting opening of the energized circuits for the valve 45 and the reversing valve 34 opens the valve 45 and restores the valve 34 to its normal condition to supply air in the cylinder 22 to thereupon effect a closing movement of the bin gate. As the gate 6 is advanced toward its closed position, the free end of the control lever 100 for the adjustably positioned switch 97 is engaged by the cam portion 114 of the rod 108 to finally close the switch and thereby close the circuit to energize the solenoid 53 of the valve 46 to close its valve, and so cause a stopping of the gate in the dribble position thereof shown in Figure 4 for which the switch 97 has been adjustably set.

The continued discharge of material into the pan 8 at a reduced flow rate after the gate 6 has been stopped in its dribble position finally results in a masking of the photoelectric cell 62 by the mask 64 and the breaking of the circuit of the motor valve 46 at the relay 68 to restore the valve to its open position and so release the gate for its fully closed disposal as determined by the engagement of the bumper ring 27 between the piston 21 and the cylinder head 24. When the gate 6 has been closed, the indicator hand 54 is retained at the position determined by the completed charge in the pan 8, said position being indicated in dash lines in Figure 4 and preferably being the zero position for the hand as adjustably predetermined by the appropriate setting of the switch 97 on the support rod 110 and the effective angular spacing of the masks 63 and 64 on the indicator hand. After both gates 6 of the present two-bin apparatus are closed, the pan gates 65 may be opened to discharge the weighted-out charges into an underlying receptacle (not shown), and the resulting return of the hand 54 to its off-zero position restores the apparatus and circuits to their conditions of Figure 2 in readiness for the repetition of the continuous cycle of open and dribble and closed positionings of the gates.

With particular reference to the adjustments provided for the present control device, it will be understood that the preferable settings of the switches 86 and 97 on and along the support rod 110 therefor are determined by the flow qualities of the material being weighed out, and are therefore variable with the materials. Furthermore, it may be desirable to adjust the timing of the masking of a photoelectric cell 61 with respect to the beginning of the upswing of the scalebeam arm 17 and/or with respect to the masking of the photoelectric cell 62; in the present structure, the masks 63 and 64 are fixed on the hand by means of mounting screws 116 engaged in arcuate mask slots 117 which are coaxial with the pivot axis of the hand to permit their independent adjustments with respect to the hand in their arcuate lines of swinging with the hand. It will be understood that relative adjustments of the photoelectric cells 61 in arcuate lines opposite the lines of movements of the masks might be provided for as the operative equivalent of the device of adjusting the masks on the supporting indicator hands, and that the various means of adjustment referred to individually or collectively comprise a means adjustable to adjustably predetermine the open and dribble positions of a bin gate for the repeated weighing-out by the associated scales of charges of exact predetermined mass in the scale pan.

It will be particularly noted that the described application of the present control device to an associated plurality of automatic weighing machines facilitates the simultaneous production of charges having a predetermined weight ratio and is not limited to an association of two machines as is herewith disclosed for illustrative purposes. The multiple application of the device is understood to provide for the automatic and simultaneous weighing-out of charges of different materials for batch mixing in any desired weight ratio, as in providing a plaster mixture of hydraulic cement and sand with two machines, or a concrete mixture of hydraulic cement and sand and rock with three machines, etc.

While the features and principles herein disclosed are particularly described as directed to a beam scales, it will be understood that the present control of a bin gate through the use of a photo-electric cell arrangement for conditioning the circuits of the two-way valve 34 and the cut-off valve 46 as required in an operating cycle is readily applicable to a spring scales by utilizing the different positionings of the scale pan under its loading to effect the control of the valves. It will also be understood that the conditions of the valves 34 and 45 and 46 might be controlled in accordance with the disposal of a weighing-out receptacle or pan by the use of other circuits and/or devices than those particularly disclosed for the purpose.

From the foregoing description taken in connection with the accompanying drawings, the advantages of the construction and operation of the present weighing machine control will be readily understood by those skilled in the art to which this invention appertains. While I have described the features and principles of operation of an apparatus which I now consider to comprise a preferred embodiment of my invention, I desire to have it understood that the showing is primarily illustrative, and that such changes may be made, when desired, as fall within the scope of the following claims.

I claim:

1. In apparatus for weighing material from a supply bin having a normally closed discharge gate at its bottom, a weighing-out receptacle arranged to receive the material discharged through the bin gate and mounted for its displacement under the weight of material deposited therein from the bin, a cylinder containing a double-acting piston operably connected to said gate to open and close the same, said cylinder being connected with fluid ducts at opposite ends thereof, a source of fluid under pressure, a two-way valve connecting said ducts with said fluid source and alternately settable to simultaneously connect one of said ducts with said fluid source and the other of said ducts with a fluid-discharging outlet of the valve for an actuation of the piston to effect opening and closing movements of the bin gate, normally open shut-off valves interposed in said ducts between the two-way valve and the cylinder for selective closing alternately, means automatically operative during a piston stroke to close the shut-off valve of the said duct which is then functioning as the exhaust passage from the cylinder, the closing of a said shut-off valve being arranged to result in a piston-stopping back-pressure in the fluid between the valve and the piston for limiting the movement of the piston toward the cylinder end at which the said duct containing the closed shut-off valve is connected and thereby dispose and hold the bin gate in a predetermined open position and means automatically controlling the functions of said two-way and shut-off valves in accordance with the position of the receptacle.

2. In apparatus for weighing material from a supply bin having a normally closed discharge gate, a weighing-out receptacle disposed to receive material discharged through the bin gate and arranged for its displacement under the weight of material deposited therein, a cylinder containing a double-acting piston connected with said gate to open and close the same, said cylinder being connected with fluid ducts at opposite ends thereof, a source of fluid under pressure, a two-way valve connecting said ducts with said fluid source and alternately settable to simultaneously connect one of said ducts with said fluid source and the other of said ducts with a fluid-discharge outlet of the valve for the actuation of the piston by the pressure fluid to effect opening and closing movements of the bin gate, means controlling the setting of said two-way valve in accordance with the position of the receptacle, a normally open shut-off valve in the said duct which functions as an exhaust passage for the cylinder during a gate-opening movement of the piston, means operative in accordance with the position of the piston during a gate-opening movement thereof to close said shut-off valve and thereby stop the piston to dispose the gate in an intermediate and limiting open position thereof by reason of the back-pressure created ahead of the piston after the valve is closed and means thereafter automatically operative by the receptacle when in its fully lowered position to effect an opening of the shut-off valve and a setting of the two-way valve for a gate-closing movement of the piston.

3. In apparatus for weighing-out material from a supply bin having a normally closed discharge gate, a weighing-out receptacle disposed to receive a charge of material from the bin and mounted for its depression under the weight of the material deposited therein, a cylinder containing a double-action piston operably connected with said bin gate to open and close the same, said cylinder being connected with fluid ducts at opposite ends thereof, a source of fluid under pressure, a two-way electrically controlled valve having a fluid-discharge outlet and connected with said ducts and said fluid source and alternately settable to simultaneously connect one of said ducts with said fluid source and the other of said ducts with the fluid-discharge outlet of the valve for effecting the actuation of the piston by the fluid to provide opening and closing movements of the bin gate, a normally open electrically-controlled shut-off valve interposed directly in the said duct which functions as an exhaust passage for the cylinder during a gate-closing stroke of the piston, said shut-off valve being closable to stop the piston intermediate of its gate-closing stroke by reason of the back-pressure created between the piston and valve after the valve is closed, an electric control circuit for said shut-off valve, a normally open switch in said circuit arranged for its mechanical closing in direct accordance with the position of the piston in the cylinder as it moves to close the gate, a switch means controlled by a photo-electric cell automatically operative when the receptacle assumes a predetermined lowered position by reason of its loading to close said circuit of the shut-off valve for stopping the bin gate in a dribble position thereof, and a switch means controlled by a photo-electric cell automatically operative as the receptacle thereafter assumes a substantially full-charge position to open said circuit of the shut-off valve for an opening of said cut-off valve for relieving said back pressure and thereby permitting a full closing of the gate by the piston.

4. In apparatus for weighing material from a supply bin or the like having a normally closed discharge gate at its bottom, a weighing-out receptacle arranged to receive the material discharged through the bin gate and mounted for its displacement from a limiting raised position to a limiting lowered position under the weight of material deposited therein, a cylinder containing a double-action piston connected to said gate for effecting opening and closing strokes of the gate by its strokes, said cylinder being connected with fluid ducts at the opposite ends thereof, a source of fluid under pressure, a two-way valve connecting said ducts with said fluid source and alternately settable to simultaneously connect one of said ducts with said fluid source for an actuation of the piston in a gate-moving stroke and the other of said ducts with an exhaust outlet of the valve, normally open shut-off valves interposed between the two-way valve and the cylinder in said ducts and arranged for their selective closing, means operative to close the shut-off valve in that duct which is functioning as an exhaust passage with respect to the cylinder, and means automatically controlling the functioning of said valves in accordance with the position of the receptacle such that a piston-actuating setting of the two-way valve while the receptacle is at either said limiting position thereof is followed by a closing of the shut-off valve to arrest the motion of the piston upon a disposal of the receptacle in a different position.

5. In apparatus for weighing material from a supply bin or the like having a discharge gate at its bottom, a weighing-out receptacle arranged to receive the material discharged through the opened bin gate and mounted for its displacement under the weight of material deposited therein, a cylinder containing a double-acting piston connected to said gate by a piston rod for effecting opening and closing strokes of the gate by its different strokes, said cylinder being connected with fluid ducts at opposite ends thereof, a source of piston-operating fluid under pressure, a two-way valve connecting said ducts with said fluid source, means operative to alternately set the two-way valve in accordance with limiting positions of the receptacle to simultaneously connect one said duct with said fluid source and the other said duct with a fluid-discharging exhaust outlet of the valve for effecting opposite actuations of the piston in gate-moving strokes thereof by reason of alternate settings of the valve, a normally open electromagnetically controlled shut-off valve interposed in at least one of said ducts between the two-way valve and the cylinder and arranged for the energizing of its solenoid to close it while the duct including it is functioning as an exhaust passage for the cylinder whereby to effect a stopping of the piston and gate in an intermediate position of their stroke while the valve is closed, an electric control circuit for the shut-off valve providing a switch arranged for its closing by means on the piston rod as the piston approaches the cylinder end from which exhaust is occurring and a second switch in series connection with the first arranged for its closing in accordance with the position of the receptacle and before the first circuit switch is closed, said circuit being otherwise closed, whereby the closing of the first switch is required to complete the closing of the control circuit and the closing of the shut-off valve.

JAMES W. DRINNON.